US010595215B2

United States Patent
Li et al.

(10) Patent No.: US 10,595,215 B2
(45) Date of Patent: *Mar. 17, 2020

(54) REDUCING REDUNDANT OPERATIONS PERFORMED BY MEMBERS OF A COOPERATIVE SECURITY FABRIC

(71) Applicant: Fortinet, Inc., Sunnyvale, CA (US)

(72) Inventors: Hongwei Li, Burnaby (CA); Yixin Pan, Burnaby (CA); Xiaodong Xu, Surrey (CA)

(73) Assignee: Fortinet, Inc., Sunnyvale, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 15/717,723

(22) Filed: Sep. 27, 2017

(65) Prior Publication Data
US 2018/0324147 A1 Nov. 8, 2018

Related U.S. Application Data

(60) Provisional application No. 62/503,252, filed on May 8, 2017.

(51) Int. Cl.
*H04W 24/02* (2009.01)
*H04L 29/06* (2006.01)
*H04L 12/24* (2006.01)

(52) U.S. Cl.
CPC ............ *H04W 24/02* (2013.01); *H04L 41/12* (2013.01); *H04L 63/0236* (2013.01);
(Continued)

(58) Field of Classification Search
CPC . H04L 63/0236; H04L 63/1441; H04L 63/08; H04L 63/0209; H04L 63/0263;
(Continued)

(56) References Cited

U.S. PATENT DOCUMENTS 8,423,758 B2   4/2013  Singhal et al.
8,613,069 B1 *  12/2013  Martini .............. H04L 63/0815
                                                            726/8
(Continued)

OTHER PUBLICATIONS

Non-Final Rejection for U.S. Appl. No. 15/716,925 dated Nov. 15, 2017.
(Continued)

*Primary Examiner* — John B King
(74) *Attorney, Agent, or Firm* — Jaffery Watson Mendonsa & Hamilton, LLP

(57) ABSTRACT

Systems and methods for coordinating security operations among members of a cooperative security fabric (CSF) are provided. According to one embodiment, a first network security appliance of a CSF receives incoming network traffic and determines if the incoming network traffic is transmitted from a second network security appliance based on the source address of the network traffic. If the incoming network traffic is from the second network security appliance, the first network security appliance determines operations that are executed by the second network security appliance and then determines local operations. The first network security appliance executes local operations to the incoming network traffic.

24 Claims, 6 Drawing Sheets

(52) U.S. Cl.
CPC .......... *H04L 63/0263* (2013.01); *H04L 63/08* (2013.01); *H04L 63/1408* (2013.01); *H04L 63/1441* (2013.01); *H04L 63/20* (2013.01)

(58) Field of Classification Search
CPC ............. H04L 63/1433; H04L 63/1425; H04L 63/107; H04L 63/083; H04L 41/12; H04L 63/1408; H04L 63/20; H04L 41/0873; H04L 63/0272; H04L 63/145; H04L 63/1416; H04W 24/02; H04W 12/08; H04W 12/06
See application file for complete search history.

(56) References Cited

U.S. PATENT DOCUMENTS

| | | | |
|---|---|---|---|
| 9,015,823 B2 | 4/2015 | Koponen et al. | |
| 9,021,574 B1 | 4/2015 | Flowers | |
| 9,038,178 B1 | 5/2015 | Lin | |
| 9,043,893 B1 | 5/2015 | Benson et al. | |
| 9,054,990 B2 | 6/2015 | Davis et al. | |
| 9,185,088 B1* | 11/2015 | Bowen | H04L 63/0471 |
| 9,661,477 B1* | 5/2017 | Ebrahimi Afrouzi | H04W 4/08 |
| 2004/0213211 A1* | 10/2004 | Green | H04L 12/2801 |
| | | | 370/352 |
| 2005/0015626 A1* | 1/2005 | Chasin | H04L 63/0245 |
| | | | 726/4 |
| 2005/0033810 A1* | 2/2005 | Malcolm | H04L 51/12 |
| | | | 709/206 |
| 2006/0036690 A1* | 2/2006 | O'Neil | H04L 51/12 |
| | | | 709/206 |
| 2010/0223655 A1* | 9/2010 | Zheng | H04L 61/2015 |
| | | | 726/1 |
| 2011/0258454 A1* | 10/2011 | Qiu | H04L 63/08 |
| | | | 713/176 |
| 2014/0331308 A1* | 11/2014 | Smith | H04L 63/1441 |
| | | | 726/12 |
| 2014/0335844 A1* | 11/2014 | Kang | H04W 8/005 |
| | | | 455/418 |
| 2015/0118997 A1* | 4/2015 | Wu | H04L 63/205 |
| | | | 455/411 |
| 2015/0381567 A1* | 12/2015 | Johnson | G06F 21/105 |
| | | | 726/12 |
| 2016/0156607 A1* | 6/2016 | Kim | H04L 63/08 |
| | | | 726/7 |
| 2016/0219024 A1* | 7/2016 | Verzun | H04L 63/102 |
| 2017/0171154 A1* | 6/2017 | Brown | H04L 12/4641 |
| 2017/0279620 A1* | 9/2017 | Kravitz | H04L 9/3268 |
| 2018/0219926 A1* | 8/2018 | Ziskin | H04L 65/1069 |

OTHER PUBLICATIONS

Notice of Allowance for U.S. Appl. No. 15/716,925 dated Jun. 20, 2018.

* cited by examiner

REDUCING REDUNDANT OPERATIONS PERFORMED BY MEMBERS OF A COOPERATIVE SECURITY FABRIC

CROSS-REFERENCE TO RELATED PATENTS

This application claims the benefit of priority of U.S. Provisional Application No. 62/503,252, filed on May 8, 2017, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2017, Fortinet, Inc.

BACKGROUND

Field

Embodiments of the present invention generally relate to the field of network security. In particular, various embodiments relate to systems and methods for managing network security operations among cooperative security appliances.

Description of the Related Art

In a large network, many network security appliances may be deployed at different locations within the network. Network traffic transmitted to/from the network may go through multiple network security appliances along a path within the network. Usually, a network security appliance may be configured with multiple policies that define security operations to be executed on the incoming network traffic. The security operations may include network firewalling, virtual private networking (VPN), antivirus, intrusion prevention (IPS), content filtering, data leak prevention, antispam, antispyware, logging, reputation-based protections, event correlation, network access control, vulnerability management, load balancing and traffic shaping. When a network security appliance works independently, the network security appliance may execute its local operations, for example logging, IPS and antivirus scanning, to incoming network traffic and then transmit the network traffic to a next hop network security appliance. The next hop network security appliance may also work independently and execute some operations, such as logging, antivirus scanning. Therefore, operations executed by the next hop network security appliance may be redundant as these operations have already been done by the previous network security appliance at previous hops. In example above, both network security appliances execute operations to the incoming network traffic based on local policies, the incoming network traffic are logged and scanned twice at these two appliances. The repeating scanning may incur unnecessary delay on the transmission of network traffic and the redundant logging to the same network traffic may waste network resources and introduce complexity to analytics to the network loggings.

Therefore, there is a need for a cooperative security fabric (CSF) that may coordinate operations performed on network traffic to avoid or reduce redundant operations among members of the CSF.

SUMMARY

Systems and methods for coordinating security operations among members of a cooperative security fabric (CSF) are provided. According to one embodiment, a first network security appliance of a CSF receives incoming network traffic and determines if the incoming network traffic is transmitted from a second network security appliance based on the source address of the network traffic. If the incoming network traffic is from the second network security appliance, the first network security appliance determines operations that are executed by the second network security appliance and then determines local operations. The first network security appliance executes local operations to the incoming network traffic.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
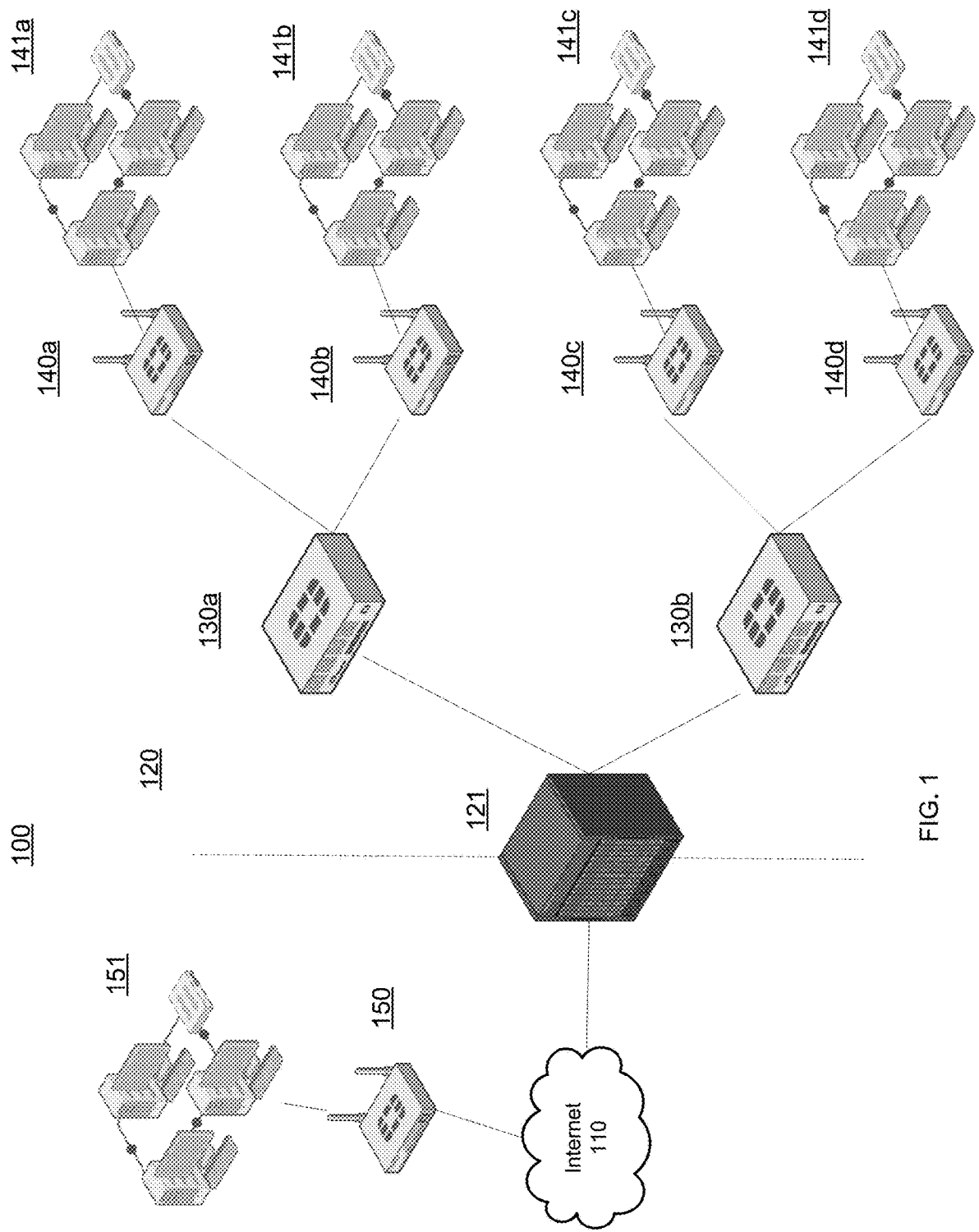
FIG. 1 illustrates an exemplary network architecture in accordance with an embodiment of the present invention.

Systems and methods for coordinating security operations among members of a cooperative security fabric (CSF) are provided. According to one embodiment, a first network security appliance of a CSF receives incoming network traffic and determines if the incoming network traffic is transmitted from a second network security appliance based on the source address of the network traffic. If the incoming network traffic is from the second network security appliance, the first network security appliance determines operations that are executed by the second network security appliance and then determines local operations. The first network security appliance applies local operations to the incoming network traffic.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be executed by hardware components or may be embodied in machine-executable instructions, which may be used to cause a general-purpose or special-purpose processor programmed with the instructions to execute the steps. Alternatively, the steps may be executed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to execute a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates exemplary network architecture 100 in accordance with an embodiment of the present invention. In the context of the present example, network architecture 100 includes a private network 120 which is connected to the Internet 110. Private network 120 includes a root network security appliance 121, middle network security appliances 130a and 130b, subnet network security appliances 140a-

140*d* and subnets 141*a*-141*d*. In this example, a subnet 151 and a subnet network security appliance 150 are connected to private network 120 through the Internet 110 via VPN. Subnet 151 and subnet network security appliance 150 may be seen as a part of private network 110.

In this example, private network 120 may be a protected enterprise network of a corporation and subnets 141*a*-141*d* may be department networks that are used exclusively by different departments of the corporation. Each of subnets 141*a*-141*d* may comprise multiple computers and servers that are coupled to each other through a Local Area Network (LAN) or wireless LAN (WLAN).

Root network security appliance 121 separates the internal computing environment of private network 120 from the external computing environment, represented by Internet 110. Root network security appliance 121 may intercept communications between Internet 110 and the network appliances of private network 110 and may, among other things, scan for malware, viruses or high risk network accesses based on its network policies.

Each of subnets 141*a*-141*d* may connect to a subnet network security appliance 140*a*-140*d*, that separates a subnet from external computing environment. Subnet network security appliances 140*a*-140*d* may intercept communications transmitted from/to the subnets and may, among other things, scan for malware, viruses or high risk network accesses based on its network policies.

Similarly, middle network security appliances 130*a* and 130*b* that connect root network security appliance 121 and subnet network security appliances 140*a*-140*d* may also inspect network traffic between root network security appliance 121 and subnet network security appliances 140*a*-140*d* based on their respective local policies.

In the present example, downstream network traffic that is transmitted from the Internet 110 to a subnet 141 goes through three network security appliances, i.e. a root, a middle and a subnet network security appliance, while upstream network traffic that is transmitted from subnet 141 to the Internet 110 goes through a subnet, a middle and a root network security appliance. Each network security appliance on a network path has the ability to execute the same security operations based its local security policies. For example, each of the root, middle and subnet network security appliances may be configured with a local policy to log all the network traffic. In embodiments of the present invention, the root, middle and subnet network security appliances form a cooperative security fabric that coordinates operations among members and avoids redundant operations even when local policies define the same operations. The operations of a cooperative security fabric will be described below in reference with FIGS. 2, 3 and 4.

Figure 2:
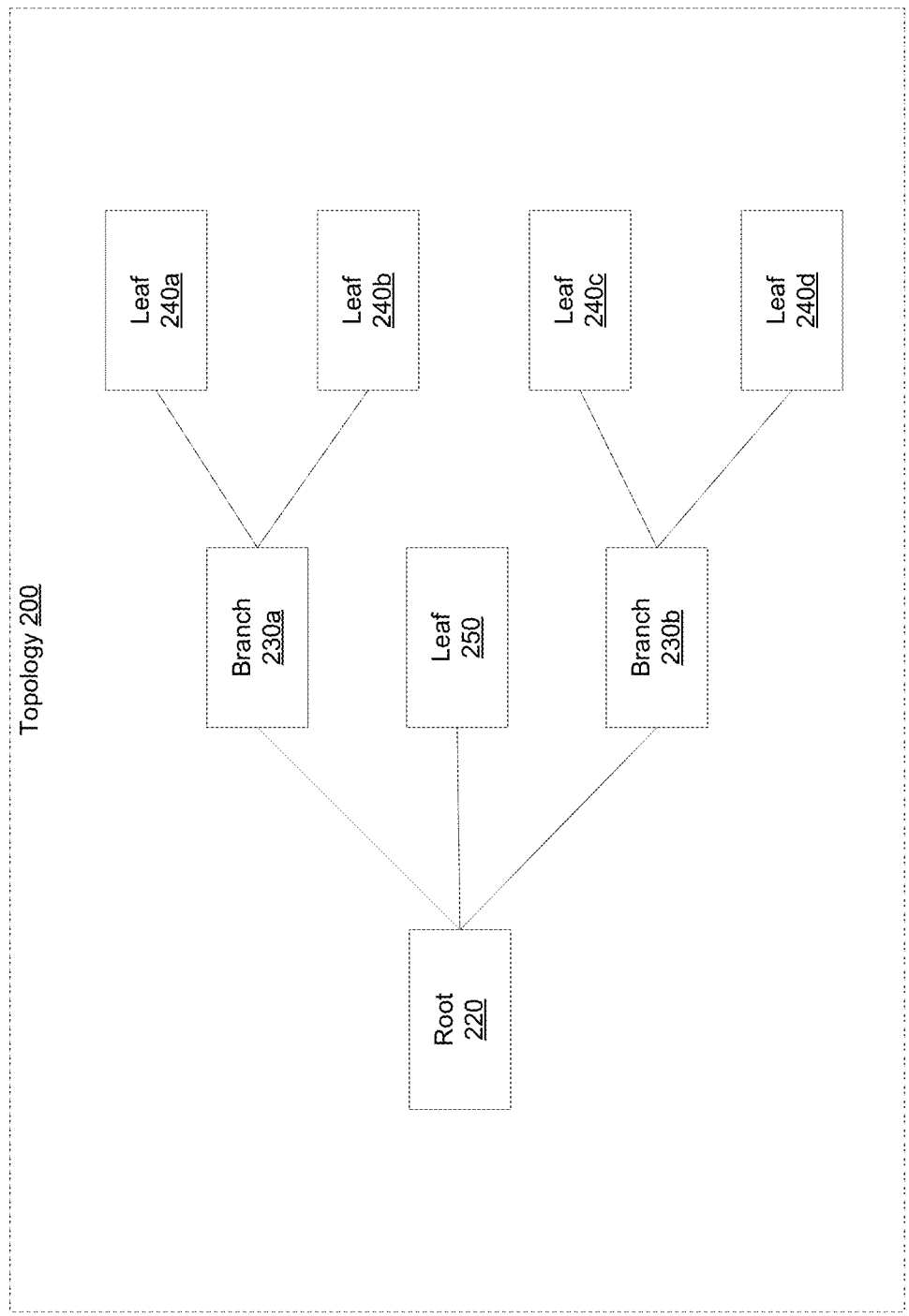
FIG. 2 is an exemplary topology of a cooperative security fabric (CSF) in accordance with an embodiment of the present invention.

FIG. 2 shows a topology 200 of a cooperative security fabric that consists of network security appliances of FIG. 1. In topology 200, a root node 220 corresponds to root network security appliance 121 which is the outermost network security appliance of the cooperative security fabric. Root node 220 acts as a WAN role in topology 200 that connects a private network to other networks or the Internet. Usually, a WAN port of root node 220 is connected to a public network and its LAN port connects to internal network appliances of the private network.

At a middle layer of topology 200, there are two branch nodes 230*a* and 230*b* correspond to middle network security appliances 130*a* and 130*b*. A branch node is a network security appliance that connects other network security appliances within the private network. For example, a WAN port of a branch node is connected to a LAN port of a root node and a LAN port of the branch node connect to a WAN port of a leaf node.

Leaf nodes 250*a*-250*d* are the network security appliances that are used for connecting endpoint devices of the private network. Endpoint devices are the sources or destinations of network traffic. Leaf nodes 250*a*-250*d* act as a LAN role in topology 200. Usually, a WAN port of a leaf node is connected to a LAN port of a branch or root node and LAN ports of leaf node are connected to endpoint devices, such as personal computers, servers, laptops, tablet computers, smart phones, printers and etc. For a cooperative security fabric, root nodes and leaf nodes are called edge nodes where network traffic is coming in or going out of the cooperative security fabric.

In FIG. 2, topology 200 includes only one root node and one layer of branch nodes. Those skilled in the art will appreciate that topology 200 may consist of other combinations of root, branch and leaf nodes. For example, topology 200 may include multiple root nodes that connect the private network to other networks. Topology 200 may have paths with no branch nodes, such the network path in which a leaf node 250 is connected to root node 220 directly. Topology 200 may have multiple layers of branch nodes, i.e., multiple branch nodes exist between a root node and a leaf node. It is also possible that a node acts as a multiple roles in the topology 200. For example, if a network security appliance connects to another network security appliance as well as endpoint devices, the network security appliance is a branch node and a leaf node in the same time.

The network shown in FIGS. 1 and 2 has a tree topology. However, those skilled in the art will appreciate that the network can be any network topology, such star, ring, mesh or full mesh topology.

In order to cooperate among members of a cooperative security fabric, each member of the cooperative security fabric needs to know its neighbor member nodes. When network traffic is received by a member node, it may check if the last hop of the network traffic is a neighbor member node of the cooperative security fabric and may determine to skip the operations that have been executed by the neighbor member at the local node. In some examples, each member node of a cooperative security fabric may store the whole topology of the cooperative security fabric instead of only neighbor members of the cooperative security fabric. The topology of the cooperative security fabric may also include distributions of operations executed by each member nodes. A member node may decide to execute or skip some operations based on the topology of the cooperative security fabric when network traffic is received from a member node.

In order to obtain the topology of a cooperative security fabric by each member node, an administrator of the cooperative security fabric may create it manually based on the structure of the private network and store the topology at each member node. However, the topology may change occasionally when a member node is replaced by a new device or the structure of the private network is changed. Therefore, an automatic configuration process is introduced so that the topology of a cooperative security fabric may be established at each member node of a cooperative security fabric.

Figure 3:
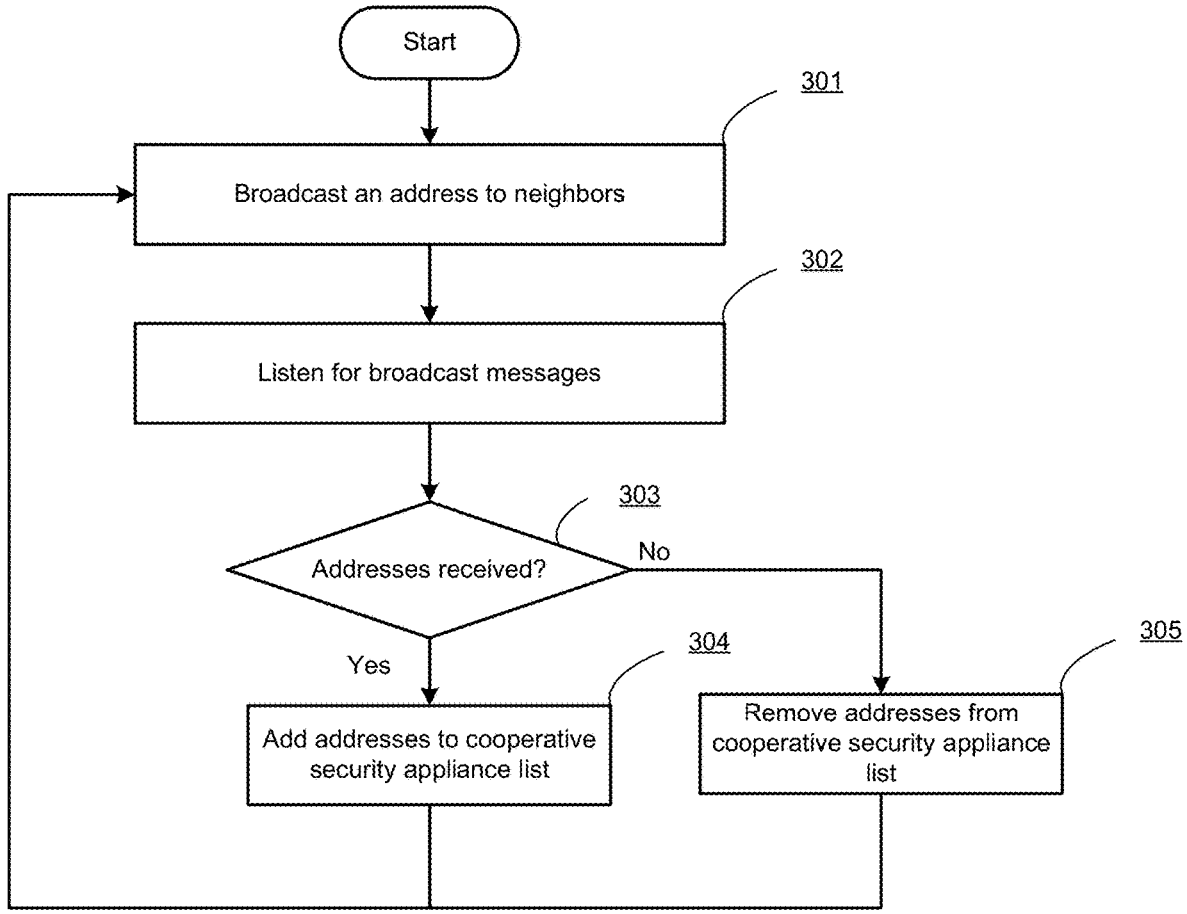
FIG. 3 is a flow diagram illustrating a method for obtaining a topology of a cooperative security fabric by a member device in accordance with an embodiment of the present invention.

FIG. 3 is a flow diagram illustrating a method for automatically obtaining a topology of a cooperative security fabric by a member appliance in accordance with an embodiment of the present invention.

At block 301, when a network security appliance is connected to a private network and configured with local policies to inspect network traffic, it may periodically broadcast its IP address or media access control (MAC) address and other CSF configuration information on the private network in order to join a cooperative security fabric. In another embodiment, the network security appliance may establish a secure tunnel with other network security appliances of the private network and exchange IP/MAC addresses and other CSF configuration information with other network security appliances. The communication between network security appliances may be based on standard protocols, such as secure shell (SSH), Hypertext Transfer Protocol Secure (HTTPS), telnet, Control And Provisioning of Wireless Access Points (CAPWAP) or Simple Network Management Protocol (SNMP), or any other private or proprietary protocols, such as FortiGate Clustering Protocol (FGCP) or FortiTelemetry from the assignee of the present invention. To make sure that the broadcasted information is not forged by a third party, a security token may be synchronized among network security appliances of the private network through the secure tunnel. The security token can be updated periodically and can be carried in a broadcast message from a network security appliance to authenticate the broadcast message.

At block 302, the network security appliance listens for broadcast messages by neighbor network security appliances of the private network.

At block 303, if the network security appliance receives broadcast messages by neighbor network security appliances, the network security appliance may check the secure tokens received with the broadcast messages to verify the authentication of the neighbor network security appliances. If the security token is verified, the network security appliance extracts an IP address and/or a MAC address of a neighbor network security appliance from the broadcast message. Other CSF configuration information of neighbor network security appliances may also be extracted from the broadcast messages if this information is broadcasted by neighbors.

At block 304, the network security appliance may store the IP addresses and/or the MAC addresses of neighbor network security appliance within a cooperative security appliance list. Table 1 shows an example of a neighbor list that is collected by a member appliance of a cooperative security fabric.

TABLE 1

Example Neighbor List
MAC addresses of CSF neighbors xx:xx:xx:xx:xx:07
xx:xx:xx:xx:xx:8e
xx:xx:xx:xx:xx:20
xx:xx:xx:xx:xx:32

In Table 1, MAC addresses of neighbor network security appliances are collected when the cooperative security fabric works at the data link layer (L2) of the Open Systems Interconnection (OSI) model.

Table 2 shows another example of a neighbor list that is collected by a member appliance of a cooperative security fabric.

TABLE 2

Example Neighbor List
IP addresses of CSF neighbors 192.168.1.100
192.168.1.101

TABLE 2-continued

Example Neighbor List
IP addresses of CSF neighbors 192.168.1.102
192.168.2.100

In Table 2, IP addresses of neighbor network security appliances are collected when the cooperative security fabric works at the network layer (L3) of the Open Systems Interconnection (OSI) model.

Besides the IP/MAC addresses of neighbor network security appliances that may be collected by a member appliance, the whole topology of a cooperative security fabric may be collected by each member appliance. For example, a member appliance may determine that it is a root node of a cooperative security fabric when it receives member information from its LAN port only. A member appliance may determine that it is a branch node of a cooperative security fabric when it receives member information on both its WAN and LAN ports. A member appliance may determine that it is a leaf node of a cooperative security fabric if it receives member information only on its WAN port. If each member node shares the part of topology known to it with other members and updates the topology based on the parts of topology shared by other member nodes, the whole topology of the cooperative security fabric may be obtained by each member node. Further, each member node may also broadcast information regarding operations (e.g., antivirus scanning, intrusion prevention (IPS), content filtering, data leak prevention (DLP), antispam, antispyware, reputation-based protections, event correlation, network access control, vulnerability management, load balancing, application control and traffic shaping) that it will perform on network traffic going through the cooperative security fabric. A whole topology of a cooperative security fabric may be shown as Table 3.

TABLE 3

Example of an Entire CSF Topology

| Member Type | MAC address | IP address | Operations |
| --- | --- | --- | --- |
| Root | xx:xx:xx:xx:xx:07 | 10.10.1.1 | Logging, IPS |
| branch | xx:xx:xx:xx:xx:e8 | 10.10.2.1 | Firewall, load balancing |
| branch | xx:xx:xx:xx:xx:34 | 10.10.2.2 | Firewall, load balancing |
| Leaf | xx:xx:xx:xx:xx:3e | 192.168.1.1 | Content filter, AV, AppControl, DLP |
| Leaf | xx:xx:xx:xx:xx:a7 | 192.168.1.2 | Content filter, AV, AppControl, DLP |
| Leaf | xx:xx:xx:xx:xx:58 | 192.168.1.3 | Content filter, AV, AppControl, DLP |
| Leaf | xx:xx:xx:xx:xx:01 | 192.168.1.4 | Content filter, AV, AppControl, DLP |
| Leaf | xx:xx:xx:xx:xx:01 | 192.168.1.4 | Content filter, AV, AppControl, DLP |

At block 305, if no broadcast message is received from a particular neighbor member for a predetermined period of time, that member may be removed from the cooperative security appliance list. Therefore, the list may be updated periodically in accordance with changes to the topology of the private network.

Figure 4:
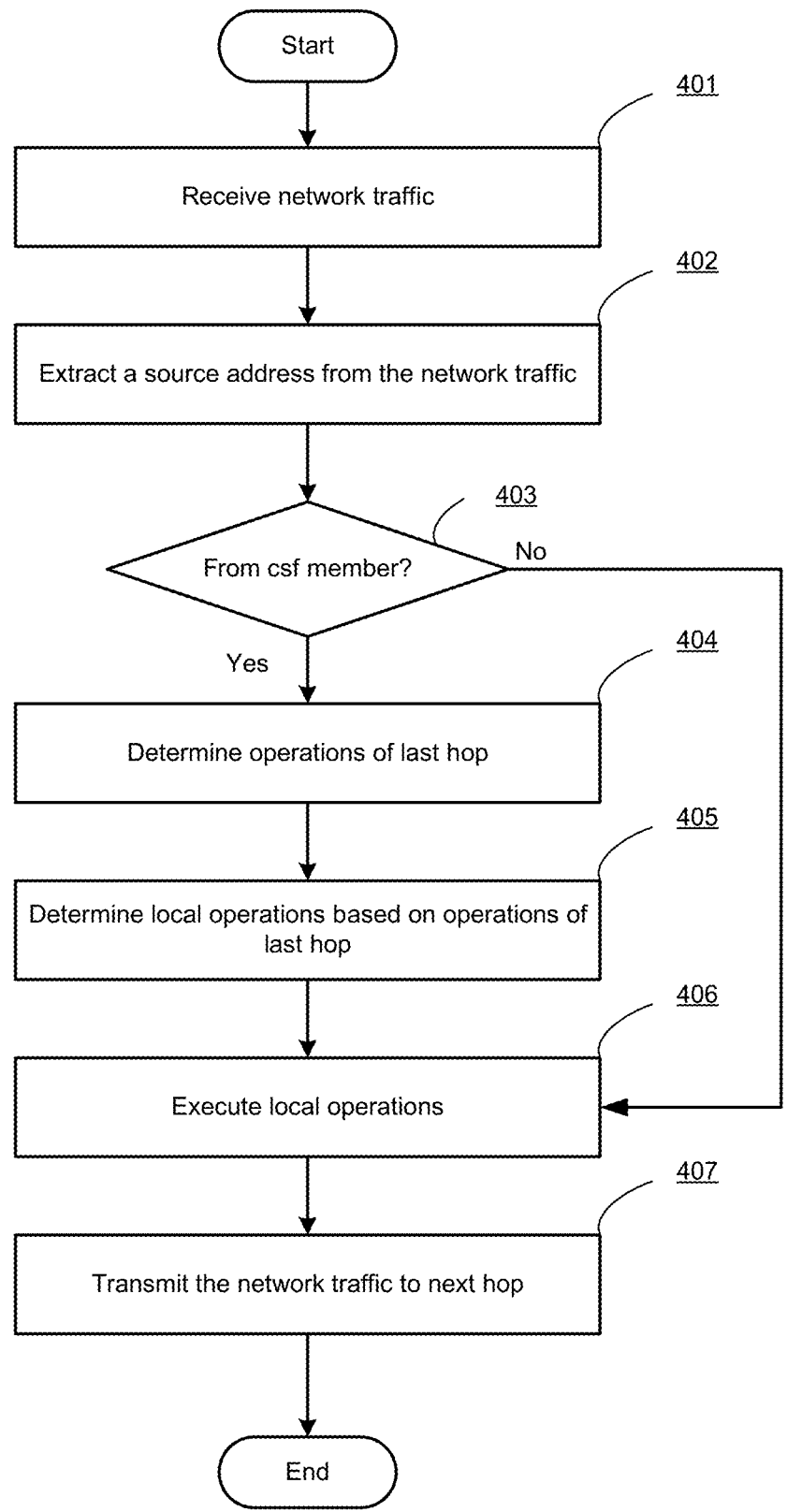
FIG. 4 is a flow diagram illustrating a method for inspecting network traffic by a member device of a cooperative security fabric in accordance with an embodiment of the present invention.

FIG. 4 is a flow diagram illustrating a method for inspecting network traffic by a member appliance of a cooperative security fabric (CSF) in accordance with an embodiment of the present invention. In this example, the CSF is assumed to have a topology as shown in FIG. 2 and works at the data link layer (L2). When an incoming network frame is received at a WAN port of a root node of the CSF, the root node encapsulates the network frame with an L2 header where an interface MAC address of the root node is attached as the source MAC address of the network frame. Then, the network frame is transmitted to a branch node that is connected to a LAN port of the root node. The branch node receives the incoming network frame at its WAN port and adds a new L2 header to the network frame where an interface MAC address of the branch node is attached as the source MAC address of the network frame. Then, the network frame is transmitted to a leaf node that connected to a LAN port of the root node. The leaf node receives the incoming network traffic at a WAN port and routes the network traffic to an endpoint device, i.e., the destination of the network traffic.

At block 401, a member node of a cooperative security fabric receives an incoming frame. The member node can be any node within the CSF, such as a root node, a branch node or a leaf node.

At block 402, the member node extracts the source MAC address of the incoming frame.

At block 403, the member node checks if the incoming frame is from another member node of the CSF. In this example, the member node maintains a CSF member list as shown in one of Tables 1-3 (above). For example, the member node may search the source MAC address of the incoming network in the CSF member list. If the source MAC address is found within the list, it means that the incoming frame is from another member of the CSF. For downstream network traffic, branch nodes may detect that incoming frames are from root nodes and leaf nodes may detect that incoming frames are from branch nodes. For upstream network traffic, branch nodes may detect that incoming frames are from leaf nodes and root nodes may detect that incoming frames are from branch nodes.

If the incoming frame is not from another member node, it means that the member node is the first member of the CSF that has received the incoming frame. This may happen to root nodes for downstream network traffic and leaf nodes for upstream network traffic. The member node may execute one or more network security operations (e.g., logging, IPS, firewall, load balancing, AV, AppControl, DLP and/or content filtering) on the incoming frame based on its local network security policies at block 406 and then the incoming frame is transmitted to next hop at block 407. If the incoming frame is from another member node, the process goes to block 404.

At block 404, the member node may determine what operations were executed by the last hop member node. In one example, the operations that are executed by last hop member node may be determined by checking the CSF member list as shown in Table 3. In another example, an administrator of the CSF may configure network security operations of a member node based on its type. For example, all root nodes of the CSF may be configured to execute logging, all branch nodes may be configured to execute firewall and all leaf nodes may be configured to execute application control, IPS and antivirus scanning. In such an embodiment, the member node may determine the network security operations performed by the last hop member node based on the type of node represented by the last hop. In another example, a network security operation, such as logging, may be executed only by the first edge node that receives the incoming network traffic. In a further example, the member node may assume that all security operations that the last hop is capable of executing have been performed by the last hop.

At block 405, the member node determines local network security operations that it will perform on the received network traffic based on network security operations assumed to have been performed by the last hop member node. In one example, the member node may skip one or more operations that have been executed by the last hop. For example, traffic logging may be executed only once at the first edge node and all other member nodes along the transmission path may skip such logging operations so as to avoid redundant logging. In another example, the member node may determine its local operations based on its status within the CSF. For example, if it is a root node, it may execute logging and IPS. If it is a branch node, it may execute firewall and load balancing. If it is a leaf node, it may execute content filter, antivirus, application control, data leakage protection. In a further example, local policies configured within the member node may override CSF rules in which case the local member node may determine to execute a network security operation although the network security operation has been previously executed by the last hope member node.

At block 406, the member node may execute the local network security operations determined based on local policies, skip network security operations that have been previously executed by the last hop member node or override the CSF rules and execute network security operations specified to be performed locally despite the fact that they were previously executed by the last hop.

At block 407, the member node may encapsulate the incoming frame with an L2 header by identifying its interface MAC address as the source address of the frame and transmit the frame to the next hop.

In the above example, the CSF works at the data link layer and member nodes of the CSF are identified by their MAC addresses. Those skilled in the art will appreciate that a CSF may alternatively work at the network layer (L3) of the OSI model and member nodes may be identified by their IP addresses rather than by their MAC addresses. For example, WAN and LAN interfaces of each leaf and middle node of the CSF may be assigned an internal IP address of a private network. Each member node may maintain a CSF member IP address list to store the IP addresses of all member nodes or neighbor nodes. When an incoming L3 packet is received at a LAN port of a member node, the member node may translate the source IP address of the packet to its WAN interface IP address by network address translation (NAT) which is well known to those skilled in the art. The packet is then transmitted to the next hop after performing NAT. When the packet is received from a LAN port of a member node at the next hop, the source address of the packet is the WAN interface IP address of the last hope member node. Therefore, the member node may determine that the packet is from another member node if the source IP address of the packet is in its CSF member node IP address list.

In the above example, the operations of the last hop may be determined based on the source address of the network traffic. Those skilled in the art will appreciate that network security operations that have been performed on the current network traffic or will be performed on future network traffic of the same session by member nodes of any previous hops can be determined by the current node. For example, when a data packet is received by a current member node, the data path of the data packet in the CSF may be determined according to the structure of the CSF as shown in Table 3.

Therefore, network security operations performed by each member node along the data path may be determined by the current node.

Figure 5:
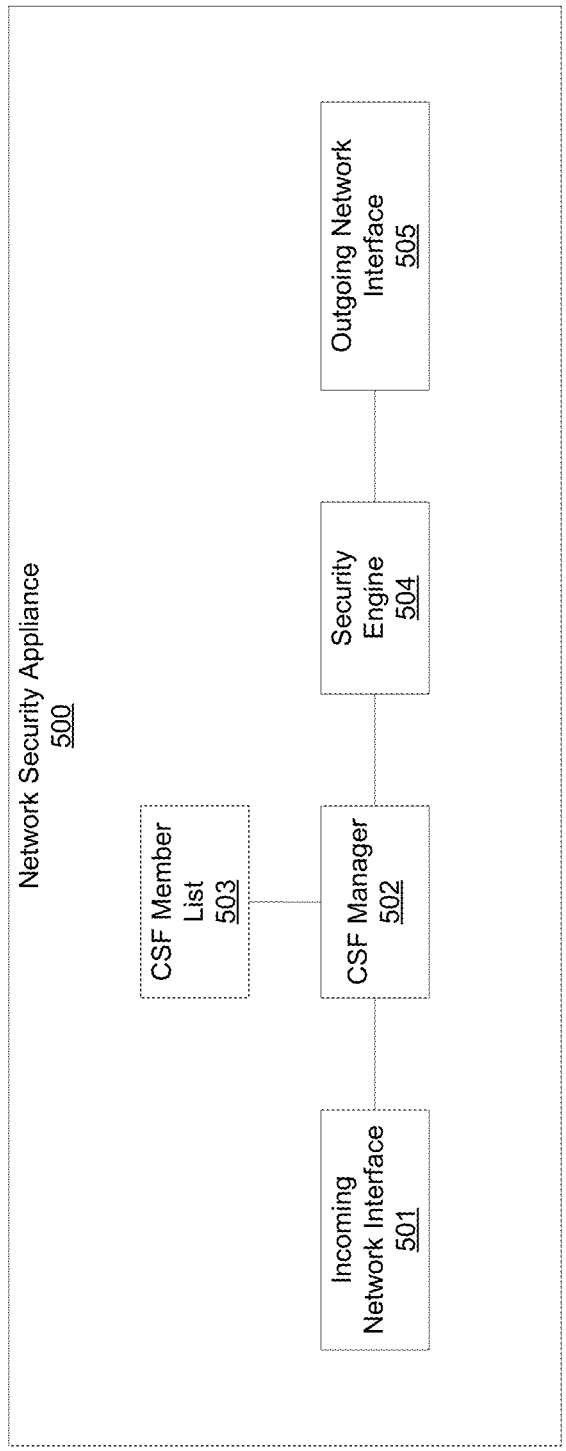
FIG. 5 is a block diagram illustrating functional units of a network security appliance that cooperates with other members of a cooperative security fabric in accordance with an embodiment of the present invention.

FIG. 5 is a block diagram illustrating functional units of a network security appliance 500 that cooperates with other members of a cooperative security fabric in accordance with an embodiment of the present invention. As shown in FIG. 5, network security appliance 500 can include an incoming network interface 501, a CSF manager 502, a CSF member list 503, a security engine 504 and an outgoing network interface 505.

CSF manager 502 is used for managing distribution of security operations among members of the CSF. In one example, CSF manager 502 may periodically broadcast a MAC/IP address, a token/signature and services/operations of network security appliance 500 on a private network or a subnet of a private network in order to notify neighbor network security appliances of such information. CSF manager 502 may also listen for CSF information broadcasted by neighbor network security appliances. If CSF manager 502 receives CSF information broadcasted by a neighbor network security appliance, the CSF information of the neighbor network security appliance may be stored within CSF member list 503. A token or signature may be synchronized among network security appliances through secure tunnels between member nodes and the token/signature may be included in the broadcast messages in order that members of the CSF may authenticate each other. In another example, CSF manager 502 may establish a secure tunnel with another neighbor network security appliance to exchange the CSF related information instead of broadcasting it on network.

Incoming network interface 501 is used for receiving network traffic from other network appliances. Network traffic at the data link layer (L2) may be network frames with a source MAC address that is the MAC address of the last hop. Network traffic at the network layer (L3) may be network packets with a source IP address that is the IP address of the last hop.

CSF member list 503 is used for storing source addresses of CSF members. In one example, CSF member list 503 may store the MAC/IP addresses of its neighbor network security appliances. In other example, CSF manager 502 may store the whole topology of the CSF as well as the distributions of network security operations among members of the CSF. CSF member list 503 may be updated periodically to ensure that the member list correctly corresponds to the current topology of the CSF. When a neighbor member node of network security appliance 500 is disconnected from the private network, no CSF related message is broadcasted by the disconnected member node. CSF manager 502 may delete the disconnected member node from CSF member list 503 when no broadcast messages are received from the disconnected member node for a predetermined or configurable period of time. In another example, CSF member list 503 may be created by an administrator at a management appliance of the CSF, such as FortiManager, FortiGuard or FortiCloud devices available from the assignee of the present application. A member node is connected to the private network, it can join the CSF and download CSF member list 503 from the management appliance. In a further example, CSF member list 503 may be created or configured locally on network security appliance 500. The administrator of the CSF may configure CSF member list 503 manually through the user interface.

After network traffic is received at incoming network interface 501, the source address of the network traffic may be extracted by CSF manager 502. CSF manager 502 may search for the source address within CSF member list 503. If the source address is found in CSF member list 503, CSF manager 502 may determine that the network traffic has been transmitted from a member node of the CSF representing the last hop. CSF manager 502 may further determine what network security operations were performed on the network traffic by the member node at the last hop. CSF manager 502 may determine the operations by searching CSF member list 503 that stores the operation distributions of the CSF. CSF manager 502 may also determine the operations that have been performed by the last hope member node based on the type of node that the last hop represents, for example, if each type of root, branch and leaf members have been assigned particular operations by the administrator of the CSF. CSF manager 502 may determine that some operations, such as traffic logging, are always done by the last hop member node.

After operations of the last hop member node are determined, CSF manager 502 may further determine the local operations that are to be executed. For example, CSF manager 502 may determine that operations that are defined by local security policies should be executed at local machine but skip the operation that have been previously performed by the last hop member node based on the CSF rule. Therefore, the operations that have been performed by the last hop member node will not be repeated by the local machine. In another example, CSF manager 502 may determine to override the CSF rule based on a local rule, i.e., the operations that have been performed by the last hop member node will be executed again at local machine.

Security engine 504 is used for executing security operations determined by CSF manager 502. Security engine 504 may inspect the network traffic to determine if the network traffic should be allowed or blocked. Other operations, such as antivirus, DLP, IPS, of security engine 504 are well known to those skilled in the art and further description thereof will be omitted.

Outgoing network interface 505 is used for transmitting the network traffic to the next hop after the network traffic is inspected by security engine 504. When the CSF works at L2, an incoming network frame is encapsulated by attaching the MAC address of the outgoing network interface 505 as the source MAC address of an outgoing network frame before the outgoing network frame is transmitted to the next hop. When the CSF works at L3, the source address of an incoming network packet is translated into the IP address of outgoing network interface 505 and the network packet after NAT process is transmitted by outgoing network interface 505 to the next hop.

Figure 6:
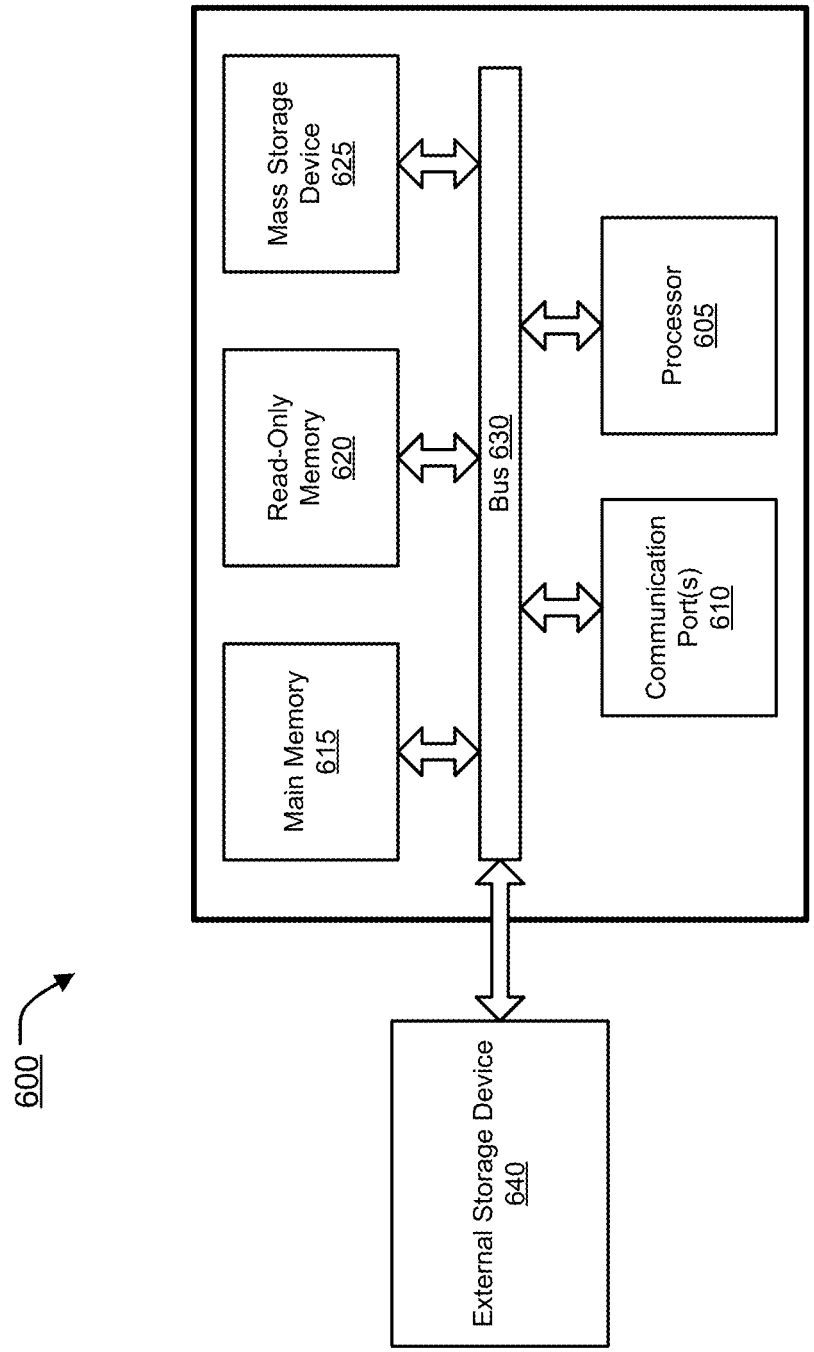
FIG. 6 is an exemplary computer system in which or with which embodiments of the present invention may be utilized.

FIG. 6 is an example of a computer system 600 with which embodiments of the present disclosure may be utilized. Computer system 600 may represent or form a part of a network security appliance (e.g., root network security appliance 121, middle network security appliance 130a or 130b, subnet network security appliance 140a-d, subnet network appliance 150 or network security appliance 500), a server or a client workstation.

Embodiments of the present disclosure include various steps, which have been described in detail above. A variety of these steps may be executed by hardware components or may be tangibly embodied on a computer-readable storage medium in the form of machine-executable instructions, which may be used to cause a general-purpose or special-purpose processor programmed with instructions to execute these steps. Alternatively, the steps may be executed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 605 may include various modules associated with embodiments of the present invention.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   receiving, by a first network security appliance of a private network that is participating in a cooperative security fabric (CSF), network traffic that is to be inspected by the first network security appliance;
   determining, by the first network security appliance, whether the network traffic has been transmitted from a second network security appliance that is participating in the CSF based on a source address of the network traffic;
   when the network traffic is determined to have been transmitted from the second network security appliance:
      determining, by the first network security appliance, one or more network security operations that are executed by the second network security appliance;
      determining, by the first network security appliance, one or more local network security operations to be executed by the first network security appliance based on the one or more network security operations that are executed by the second network security appliance; and
      executing, by the first network security appliance, the one or more local network security operations on the network traffic.

2. The method of claim 1, wherein determining, by the first network security appliance, one or more operations of the first network security appliance to be executed by the first network security appliance based on the one or more network security operations that are executed by the second network security appliance comprises skipping, by the first network security appliance, the one or more network security operations that are executed by the second network security appliance.

3. The method of claim 1, wherein determining, by the first network security appliance, one or more network security operations of the first network security appliance to be executed by the first network security appliance based on the one or more network security operations that are executed by the second network security appliance comprises determining, by the first network security appliance, one or more network security operations that are to be executed by the first network security appliance except the one or more network security operations that are executed by the second network security appliance based on local network polices.

4. The method of claim 1, wherein determining, by the first network security appliance, one or more network security operations of the first network security appliance to be executed by the first network security appliance based on the one or more network security operations that are executed by the second network security appliance comprises determining, by the first network security appliance, that the one or more network security operations that are executed by the second network security appliance are to be executed by the first network security appliance.

5. The method of claim 1, further comprising when the network traffic is not transmitted from the second network security appliance, executing, by the first network security appliance, one or more local network security operations defined by one or more local policies.

6. The method of claim 1, further comprising maintaining, by the first network security appliance, a list of a plurality of network security appliances participating in the CSF, wherein multiple network security operations to be applied to network traffic are distributed among each network security appliance of the plurality of network security appliances that are along a path on which the network traffic is transmitted through the private network.

7. The method of claim 6, further comprising:
periodically broadcasting, by the first network security appliance, a source address of the first network security appliance on the private network to the plurality of network security appliances;
receiving, by the first network security appliance, a source address of the second network security appliance broadcasted by the second security appliance on the private network;
updating, by the first network security appliance, the list by storing the source address of the second security appliance within the list.

8. The method of claim 7, further comprising removing, by the first network security appliance, a third network security appliance of the plurality of network security appliances from the list when no broadcast is received from the third network security appliance by the first network security appliance within a predetermined or configurable period of time.

9. The method of claim 6, wherein the list is received by the first network security appliance from a management appliance within the private network.

10. The method of claim 6, wherein the list is created manually on the first network security appliance.

11. The method of claim 6, wherein the list further comprises information regarding a distribution of network security operations to be performed by the plurality of network security appliances.

12. The method of claim 1, wherein the source address of the network traffic comprises a media access control (MAC) address of a frame of the network traffic or an Internet protocol (IP) address of a packet of the incoming network traffic.

13. The method of claim 12, further comprising:
changing, by the first network security appliance, the MAC address of the frame of the network traffic to a MAC address of the first network security appliance; and
transmitting, by the first network security appliance, the network traffic to a next hop network security appliance of the plurality of network security appliances.

14. The method of claim 12, further comprising:
translating, by the first network security appliance, the IP address of the packet of the network traffic to an IP address of the first network security appliance; and
transmitting, by the first network security appliance, the network traffic to a next hop network security appliance of the plurality of network security appliances.

15. The method of claim 1, wherein the one or more network security operations include network traffic logging.

16. The method of claim 1, wherein the one or more network security operations include one or more of antivirus scanning, intrusion prevention (IPS), content filtering, data leak prevention, antispam, antispyware, reputation-based protections, event correlation, network access control, vulnerability management, load balancing, application control and traffic shaping.

17. A non-transitory computer-readable storage medium embodying a set of instructions, which when executed by one or more processors of a network security appliance of a private network that is participating in a cooperative security fabric (CSF), causes the one or more processors to perform a method comprising:
receiving network traffic that is to be inspected;
determining whether the network traffic has been transmitted from a second network security appliance that is participating in the CSF based on a source address of the network traffic;
when the network traffic is determined to have been transmitted from the second network security appliance:
determining one or more network security operations that are executed by the second network security appliance;
determining one or more local network security operations to be performed on the network traffic based on the one or more network security operations that are executed by the second network security appliance; and
performing the one or more local network security operations on the network traffic.

18. The non-transitory computer-readable storage medium of claim 17, wherein said determining one or more local network security operations comprises excluding the one or more network security operations that are executed by the second network security appliance.

19. The non-transitory computer-readable storage medium of claim 17, wherein said determining one or more local network security operations comprises determining that the one or more network security operations that are executed by the second network security appliance are to be re-executed by the network security appliance.

20. The non-transitory computer-readable storage medium of claim 17, wherein the method further comprises when the network traffic is not transmitted from the second network security appliance, executing one or more local network security operations defined by one or more local policies.

21. The non-transitory computer-readable storage medium of claim 17, wherein the method further comprises maintaining a list of a plurality of network security appliances participating in the CSF, wherein multiple network security operations to be applied to the network traffic are distributed among each network security appliance of the plurality of network security appliances that are along a path on which the network traffic is transmitted through the private network.

22. The non-transitory computer-readable storage medium of claim 21, wherein the list further comprises information regarding a distribution of network security operations to be performed by the plurality of network security appliances.

23. The non-transitory computer-readable storage medium of claim 17, wherein the one or more network security operations include network traffic logging.

24. The non-transitory computer-readable storage medium of claim 17, wherein the one or more network security operations include one or more of antivirus scanning, intrusion prevention (IPS), content filtering, data leak prevention, antispam, antispyware, reputation-based protections, event correlation, network access control, vulnerability management, load balancing, application control and traffic shaping.

* * * * *